(12) United States Patent
Liu et al.

(10) Patent No.: US 11,452,082 B2
(45) Date of Patent: Sep. 20, 2022

(54) DATA TRANSMISSION METHOD AND APPARATUS, AND DATA RECEPTION METHOD AND APPARATUS

(71) Applicant: ZTE CORPORATION, Guangdong (CN)

(72) Inventors: Xing Liu, Guangdong (CN); Peng Hao, Guangdong (CN); Wei Gou, Guangdong (CN); Zhisong Zuo, Guangdong (CN); Chunli Liang, Guangdong (CN); Feng Bi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/753,320

(22) PCT Filed: Nov. 27, 2018

(86) PCT No.: PCT/CN2018/117681
§ 371 (c)(1),
(2) Date: Apr. 2, 2020

(87) PCT Pub. No.: WO2019/105341
PCT Pub. Date: Jun. 6, 2019

(65) Prior Publication Data
US 2020/0280969 A1    Sep. 3, 2020

(30) Foreign Application Priority Data

Nov. 29, 2017   (CN) .......................... 201711230884.X

(51) Int. Cl.
*H04W 72/04*       (2009.01)
*H04W 76/27*       (2018.01)
(Continued)

(52) U.S. Cl.
CPC ......... *H04W 72/042* (2013.01); *H04L 1/1812* (2013.01); *H04L 5/0055* (2013.01); *H04W 76/27* (2018.02); *H04W 72/044* (2013.01)

(58) Field of Classification Search
CPC ............................. H04L 5/001; H04L 5/0055
See application file for complete search history.

(56) References Cited

U.S. PATENT DOCUMENTS

2011/0002276 A1    1/2011   Chen et al.
2012/0236812 A1*   9/2012   Chen ..................... H04L 1/1685
                                                          370/329
(Continued)

FOREIGN PATENT DOCUMENTS

CN    102347826 A    2/2012
CN    104253677 A    12/2014
(Continued)

OTHER PUBLICATIONS

WIPO, International Search Report dated Jan. 29, 2019.
(Continued)

*Primary Examiner* — Ayaz R Sheikh
*Assistant Examiner* — Debebe A Asefa
(74) *Attorney, Agent, or Firm* — Li & Cai Intellectual Property (USA) Office

(57) ABSTRACT

A data transmission method and apparatus, and a data reception method and apparatus. The data transmission method comprises steps of: generating at least one total downlink assignment index for a plurality of component carrier groups; and carrying the at least one total downlink assignment index in downlink control information to transmit the same to a receiving end.

17 Claims, 6 Drawing Sheets

(51) Int. Cl.
*H04L 1/18* (2006.01)
*H04L 5/00* (2006.01)

(56) References Cited

U.S. PATENT DOCUMENTS

| | | | |
|---|---|---|---|
| 2018/0006790 A1 | 1/2018 | Park et al. | |
| 2019/0141727 A1 | 5/2019 | Si et al. | |
| 2019/0253204 A1* | 8/2019 | Takeda | H04W 28/04 |
| 2020/0366425 A1* | 11/2020 | Takeda | H04L 5/0055 |

FOREIGN PATENT DOCUMENTS

| | | |
|---|---|---|
| CN | 104601303 A | 5/2015 |
| CN | 106788936 A | 5/2017 |
| CN | 107210889 A | 9/2017 |
| CN | 107359969 A | 11/2017 |
| CN | 107370570 A | 11/2017 |
| EP | 3068181 A | 9/2016 |
| EP | 3383110 A1 | 10/2018 |
| WO | WO 2017110954 A | 6/2017 |

OTHER PUBLICATIONS

China Patent Office, First Office Action dated Feb. 3, 2021, for corresponding Chinese application No. 201711230884.X.
European Patent Office, extended European patent search report dated Jul. 2, 2021 corresponding to EP Application No. 18884117.5.
Ericsson, "On HARQ Mangament", 3GPP Draft, dated Oct. 8, 2017.
Fujitsu, "Discussion on HARQ-ACK codebool and HARQ feedback timing", 3GPP Draft, dated Nov. 17, 2017.

* cited by examiner

| Uplink grant information | GBG TI information field (GBG TI field) | uplink scheduling timing information K2 | Total DAI |

| Uplink grant information | GBG TI information field (GBG TI field) | indication information field of uplink grant timing | ns # DATA TRANSMISSION METHOD AND APPARATUS, AND DATA RECEPTION METHOD AND APPARATUS

The present disclosure claims priority to Chinese patent application No. 201711230884.X filed on Nov. 29, 2017 in the China National Intellectual Property Administration, the entirety of which is incorporated herein by reference.

FIELD OF THE INVENTION

The present disclosure relates to the field of communication, and in particular, to a data transmission method and apparatus, and a data reception method and apparatus.

BACKGROUND

In the related art, in a new-generation wireless communication (New RAT, NR) system, some new technical features are introduced, which puts forwards new demands on determination of a Hybrid Automatic Repeat Request (HARQ) feedback codebook.

On one hand, the NR system supports Carrier Aggregation (CA) between Component Carriers (CCs) with different Subcarrier Spacings (SCSs). In this regard, unlike the Long Term Evolution (LTE) system, slots of CCs with different subcarrier spacings have different lengths. How to support dynamic codebook determination during aggregation between CCs with different subcarrier spacings is a problem to be solved.

On the other hand, uplink feedback timing of a terminal is dynamically configured, that is, a network side configures an uplink feedback timing set semi-statically through a Radio Resource Control (RRC) signaling, and further dynamically indicates in a Downlink Control Indication (DCI) which value in the set is the timing adopted by the current slot. This makes the feedback more flexible, but the size of the feedback codebook becomes more dynamic.

In addition, the NR system supports a feedback based on a Code Block Group (CBG), that is, an original Transmission Block (TB) is divided into a plurality of CBGs, and the terminal receives downlink data in units of CBGs and performs feedback on the received CBGs one by one. The main advantage of doing so is in that the retransmitted data size can be reduced, and under the original feedback mechanism based on the TB, the terminal can only feed back Acknowledgement (ACK)/No Acknowledgement (NACK) according to the situation of receiving whole TB, and when the base station receives the feedback of the terminal, the TB corresponding to the No Acknowledgement (NACK) can be retransmitted as a whole; under a feedback mechanism based on the CBG, the terminal respectively feeds back a plurality of CBGs in the TB, and the base station only retransmits the CBGs which feed back NACK. Adding ACK or NACK feedback codebook determination in a CBG feedback mode is also a problem to be concerned.

In view of the problem of lack of a determination mechanism scheme of a feedback codebook in the related art, no effective solution exists at present.

SUMMARY

The embodiments of the present disclosure provide a data transmission method and apparatus and a data reception method and apparatus, to at least solve the problem of lack of a determination mechanism scheme of a feedback codebook in the related art.

According to an embodiment of the present disclosure, there is provided a data transmission method, including: generating at least one total downlink assignment index for a plurality of component carrier groups; and carrying the at least one total downlink assignment index in downlink control information to transmit to a receiving end.

According to another embodiment of the present disclosure, there is further provided a data reception method, including: receiving a plurality of total downlink assignment indexes, wherein the plurality of total downlink assignment indexes correspond to a plurality of component carrier groups; and determining a size of a feedback codebook of the corresponding component carrier groups according to the plurality of total downlink assignment indexes.

According to another embodiment of the present disclosure, there is further provided a data transmission apparatus, including: a generation module configured to generate at least one total downlink assignment index for a plurality of component carrier groups; and a transmission module configured to carry the at least one total downlink assignment index in downlink control information and transmit to a receiving end.

According to another embodiment of the present disclosure, there is further provided a data reception apparatus, including: a reception module configured to receive a plurality of total downlink assignment indexes, wherein the plurality of total downlink assignment indexes correspond to a plurality of component carrier groups; and a determination module configured to determine a size of a feedback codebook of the corresponding component carrier groups according to the plurality of total downlink assignment indexes.

According to another embodiment of the present disclosure, there is further provided a storage medium including a stored program, wherein the stored program, when executed, performs the method according to any one of the subsequent embodiments.

According to another embodiment of the present disclosure, there is further provided a processor configured to execute a program, wherein the program, when executed by the processor, performs the method according to any one of the subsequent alternative embodiments.

BRIEF DESCRIPTION OF THE DRAWINGS

The drawings described herein are intended to provide a further understanding of the disclosure and form a part of the disclosure. The illustrative embodiments of the present disclosure and the description thereof are used to explain the disclosure and do not constitute an undue limitation. In the drawings.

DETAILED DESCRIPTION OF THE EMBODIMENTS

In an embodiment of the present disclosure, there is provided a mobile communication network (including but not limited to a 5G mobile communication network), and a network architecture of the network may include a network side device (e.g., a base station) and a terminal. In the embodiment, there is provided a data transmission method that is capable of operating on the above network architecture. It should be noted that, the operation environment of the data transmission method according to the embodiments is not limited to the network architecture.

Embodiment 1

Figure 1:
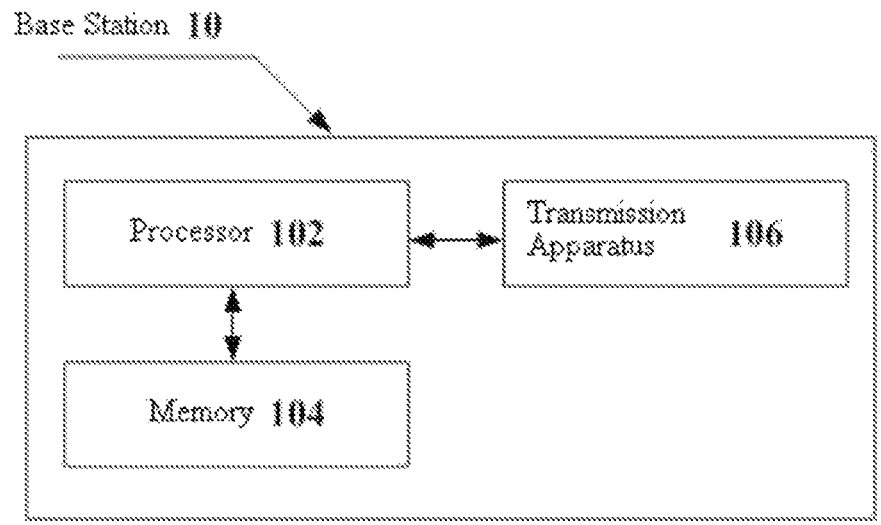
FIG. 1 is a block diagram showing a hardware structure of a base station of a data transmission method of an embodiment of the disclosure.

A process embodiment according to Embodiment 1 of the present disclosure may be executed in a base station, a mobile terminal, or a similar computing device. Taking an operation on a base station as an example, FIG. 1 is a block diagram showing a hardware structure of a base station of a data transmission method of an embodiment of the present disclosure. As shown in FIG. 1, a base station 10 may include at least one processor 102 (only one is shown in the figure, and the processor 102 may include but is not limited to a processing device such as a microprocessor (Microcontroller unit, MCU) or a programmable logic device (Field Programmable Gate Array, FPGA)), a memory 104 configured to store data, and a transmission apparatus 106 configured to perform a communication function. It will be appreciated by those skilled in the art that the structure as shown in FIG. 1 is only for illustration and is not intended to limit the structure of the electronic apparatus. For example, the base station 10 may further include more or less components than those as shown in FIG. 1, or have different configurations than those as shown in FIG. 1.

The memory 104 may be configured to store software programs and modules of application software, such as program instructions/modules corresponding to the data transmission method in the embodiment of the disclosure, and the processor 102 executes various functional applications and data processing by executing the software programs and modules stored in the memory 104, so as to implement the method described above. The memory 104 may include a high-speed random access memory, and may also include a non-volatile memory, such as at least one of: a magnetic storage apparatus, a flash memory, or other non-volatile solid-state memory. In some examples, the memory 104 may include memories remotely located from the processor 102, and these memories may be connected to the base station 10 through networks. Examples of such networks include, but are not limited to, the Internet, intranets, local area networks, mobile communication networks, and combinations thereof.

A transmission apparatus 106 is configured to receive or transmit data via a network. Examples of such network applications may include wireless networks provided by a communication provider of the base station 10. In one example, the transmission apparatus 106 includes a network adapter (Network Interface Controller, NIC) that can be connected to other network devices through a base station so as to communicate with the Internet. In one example, the transmission apparatus 106 may be a Radio Frequency (RF) module configured to communicate with the Internet in a wireless manner.

In a Long Term Evolution (LTE) system in the related art, a terminal performs feedback based on a Transmission Block (TB), and in a Time Division Duplexing (TDD) mode, a plurality of downlink transmission slots of the terminal may correspond to one uplink transmission slot, and at this time, the feedback for a plurality of downlink schedules may be aggregated on one uplink transmission resource (which may be a Physical Uplink Control Channel (PUCCH) or a Physical Uplink Shared Channel (PUSCH)). When Hybrid Automatic Repeat Request (HARQ) multiplexing is applied, the size of the feedback codebook depends on the number of slots and the number of codewords within the feedback window, and in a carrier aggregation scenario, the size of the feedback codebook is also related to the number of component carriers. The base station and the terminal need to have uniform knowledge on the size and sequence of the codebook, so as to avoid causing wrong retransmission.

One feedback codebook determination mode is a semi-static codebook, that is, for the downlink transmission resource within the feedback time window, no matter whether the base station schedules the downlink data of the terminal in a slot of a component carrier, the terminal will feed back for each slot of each carrier component. Obviously, since part of the downlink resource does not schedule the terminal, some feedbacks are useless overhead.

Another feedback codebook determination mode is a dynamic codebook, where a concept of Downlink Assignment index (DAI) is introduced, for example, a Downlink Control Information (DCI) corresponding to a Downlink Assignment (DL Assignment) includes a counter Downlink Assignment index (counter DAI) indication field for indicating to the terminal which slot schedules the downlink data of the terminal actually, and a Total Downlink Assignment index (Total DAI) indication field is included in the DCI which includes uplink grant (UL grant), for indicating a total number of Downlink assignments required to be fed back. The terminal determines the size of the dynamic codebook according to the Total DAI, so that the terminal can save part of useless feedback overhead in the semi-static codebook. When the terminal does not have uplink grant at the moment, Total DAI does not exist, and the feedback codebook is returned to be a semi-static codebook. The introduction of DAI increases the overhead of downlink control information. In an embodiment, in an LTE Carrier Aggregation (CA) scenario, when the number of component carriers is small (for example, not more than 5), the same manner as the above dynamic codebook mechanism under single carrier is adopted, and at this time, the counter DAI pair is aggregated to be counted in the entirety of a plurality of CCs, and the Total DAI is a total number of downlink assignments of the plurality of CCs.

Figure 2:
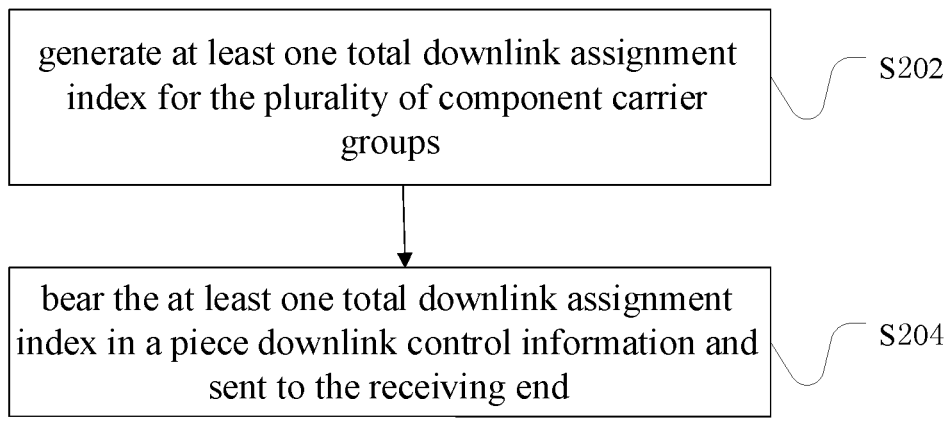
FIG. 2 is a process diagram of a data transmission method according to an embodiment of the disclosure.

In this embodiment, there is provided a data transmission method operating on the network architecture, which can be used on a base station side. FIG. 2 is a process diagram of a data transmission method according to an embodiment of the disclosure. As shown in FIG. 2, the process includes the following steps S202 and S204.

In step S202, at least one total downlink assignment index is generated for the plurality of component carrier groups.

In step S204, the at least one total downlink assignment index is carried in downlink control information to be transmitted to a receiving end.

Through the steps, at least one total downlink assignment index is generated for the plurality of component carrier groups; and the at least one total downlink assignment index is carried in the downlink control information to be transmitted to the receiving end. In the data transmission method of the present disclosure, the downlink control information includes a plurality of total downlink assignment indexes used for downlink assignment instructions of a plurality of component carrier groups, which improves a situation where a feedback codebook determination mechanism scheme is lacking in related art. After the feedback codebook determination mechanism of the above scheme is adapted to the new requirements introduced in the new system NR, the dynamic codebook needs to be processed in groups, and a plurality of total downlink assignment indexes may occur.

In an embodiment, the component carriers are divided into the plurality of component carrier groups according to at least one piece of: code block group configuration information of component carriers; a slot length or a subcarrier spacing of the component carriers; and codeword configuration information of the component carriers.

In an embodiment, the code block group configuration information includes at least one of: the number of code block groups included in a slot; and the number of code block groups included in a transmission block.

In an embodiment, the codeword configuration information includes at least one of: the number of codewords included in a slot; and the number of codewords included in a transmission block.

In an embodiment, the step of generating at least one total downlink assignment index for the plurality of component carrier groups includes at least one of: each of the generated total downlink assignment indexes corresponding to a component carrier group; and the number of the at least one of the generated total downlink assignment indexes being less than or equal to the number of the plurality of component carrier groups.

In an embodiment, the total downlink assignment index is used to indicate the number of downlink assignments required to be fed back in a specified uplink slot before an uplink grant in the component carrier group corresponding to the total downlink assignment index; wherein the number of the downlink assignments includes at least one of: the number of slots carrying the downlink assignments; and the total number of the code block groups in all the slots carrying the downlink assignments. It is necessary to supplement that the meaning of the above alternative embodiments may be as follows: the number of downlink assignments comprises the number of slots which carry the downlink assignments; or, the number of downlink assignments is the total number of code block groups in the slots which are all slots carrying downlink assignments.

In an embodiment, the specified uplink slot comprises: the uplink slot indicated by the uplink grant.

In an embodiment, the uplink grant and the total downlink assignment index are transmitted in the same downlink control information.

In an embodiment, the step of carrying the at least one total downlink assignment index in the downlink control information to be transmitted to the receiving end comprises at least one of: setting, in the downlink control information, a first information field for carrying the at least one total downlink assignment index, according to the maximum number of the total downlink assignment indexes, wherein a bit number occupied by the first information field is equal to a bit number required when the total downlink assignment indexes having the maximum number are transmitted; setting, in the downlink control information, a second information field for carrying the at least one total downlink assignment index, according to the current number of the total downlink assignment indexes, wherein a bit number occupied by the second information field is equal to a bit number required when the total downlink assignment indexes having the current number are transmitted; setting, in the downlink control information, a third information field for carrying one total downlink assignment index; wherein, when the number of the total downlink assignment indexes is more than one, information fields except the third information field in the downlink control information are multiplexed to carrying residual total downlink assignment indexes, wherein a bit number occupied by the third information field is equal to a bit number required when the one total downlink assignment index is transmitted; multiplexing, in the downlink control information, a specified information field in the downlink control information to carry the at least one total downlink assignment index; and multiplexing, in the downlink control information, the specified information field in the downlink control information to carry the total downlink assignment index, wherein, under the condition that the bit number which the specified information field is able to carry is smaller than the bit number required when a plurality of total downlink assignment indexes are transmitted, a fourth information field to carry the residual total downlink assignment indexes is set, wherein a bit number occupied by the fourth information field is equal to a bit number required when the residual total downlink assignment indexes are transmitted.

In an embodiment, the specified information field in the downlink control information comprises at least one of: an indication information field of uplink grant timing; and an indication information field of code block group transmission.

In an embodiment, the third information field is used to carry a total downlink assignment index corresponding to a component carrier group where the third information field is located.

According to another embodiment of the disclosure, there is further provided a data reception method, applicable to a terminal, including the following Step 1 and Step 2.

At Step 1, receiving, in downlink control information, at least one total downlink assignment index, wherein the at least one total downlink assignment index corresponds to a plurality of component carrier groups;

At Step 2, determining the size of the feedback codebook of the corresponding component carrier group according to the at least one total downlink assignment index.

In an embodiment, after receiving at least one total downlink assignment index in the downlink control information, according to the total downlink assignment index, the following information is determined: the number of downlink assignments required to be fed back in a specified uplink slot before an uplink grant in the component carrier group corresponding to the total downlink assignment index; wherein the number of the downlink assignments includes at least one of: the number of slots carrying the downlink assignments; and the total number of the code block groups carrying all the slots of the downlink assignments.

In an embodiment, the specified uplink slot includes the uplink slot indicated by the uplink grant.

In an embodiment, the uplink grant information and the total downlink assignment index are received in the same downlink control information.

The following description will be made in detail with reference to applicable embodiments.

Applicable Embodiment 1

This embodiment describes a situation where aggregated CCs are grouped according to CBG configuration, a plurality of component Carrier Groups (CGs) all use a dynamic codebook, and total downlink assignment indexes (Total DAIs) corresponding to all CGs are transmitted in DCI of the same CC.

Figures 3, 4, 5:
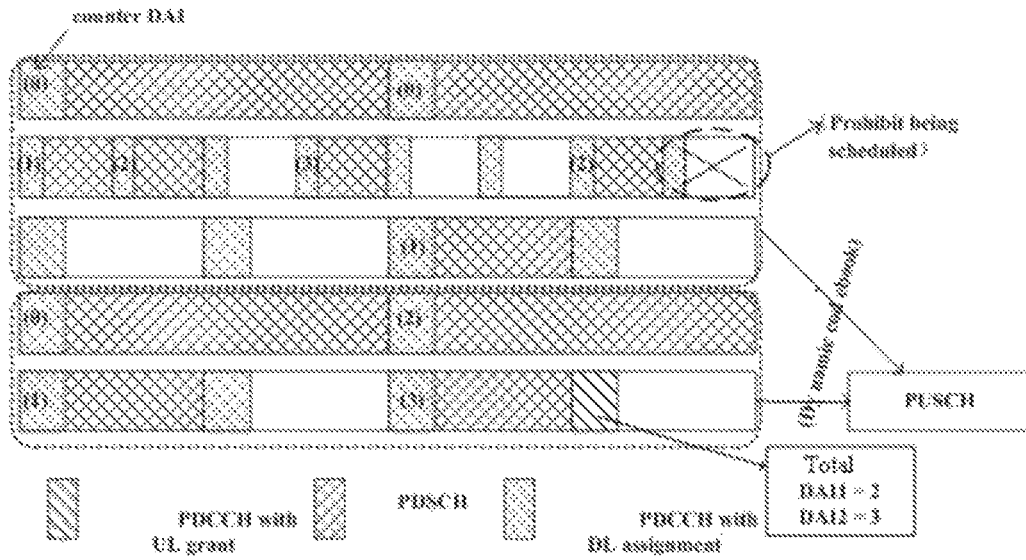
FIG. 3 is a schematic diagram according to an Applicable embodiment 1.
FIG. 4 is a schematic diagram according to a Sub-embodiment 2.3 of an Applicable embodiment 2.
FIG. 5 is a schematic diagram according to a Sub-embodiment 2.4 of the Applicable embodiment 2.

FIG. 3 is a schematic diagram according to Application Example 1. As shown in FIG. 3, a total of 5 CCs are included to operate in a carrier aggregation CA manner, namely CC #0 to CC #4, for example, the configuration shown in Table 1. Table 1 is a configuration table of CC #0 to CC #4 according to the Applicable embodiment 1:

TABLE 1

| CC | CBG configuration | Subcarrier spacing (SCS) | CG |
| --- | --- | --- | --- |
| #0 | 4 | 15 kHz | CG1 |
| #1 | 4 | 60 kHz | CG1 |
| #2 | 4 | 30 kHz | CG1 |
| #3 | 8 | 15 kHz | CG2 |
| #4 | 8 | 30 kHz | CG2 |

The aggregated CCs are divided into two CGs according to CBG configuration, CG1 including CC #0, CC #1, CC #2; CG2 including CC #3, CC #4.

The counter DAI is used to count in two CGs respectively, i.e. a counter DAI field is included in each DCI including DL assignment, for indicating which the scheduled slot in the CG required to be fed back in the same slot is the current slot. The counting sequence adopts a principle of frequency domain priority, that is, slots including DL assignment on all CCs are accumulated at the monitoring occasion of the previous Physical Downlink Control Channel (PDCCH) first, for example, for CG1, the terminal is scheduled by DCIs of CC #0 and CC #1 at the first PDCCH monitoring occasion, that is, the DCIs include DL assignment, and counter DAI fields of each DCI are respectively indicated as 0 and 1, indicating that the current slot is the first and second scheduled slots in the CG, respectively (note: DAI is counted from '0' and is cyclically counted at a period of 4, i.e., 01230123 . . . ), such a cycle count is to ensure that only 2 bits can be used to indicate any DAI value in the DCI). Then, a second PDCCH monitoring occasion is accumulatively counted. Since the subcarrier spacings of different CCs in the CG are different, the TTI lengths are also different, and the second PDCCH monitoring occasion is only valid for CC #1, and at this time, the terminal is scheduled by CC #1, and the counter DAI field of the DCI is indicated as 2. By analogy, the count of DL assignment of all slots before the UL grant is received within the feedback time window is completed; and the feedback information of the DL assignment is all transmitted to the base station in the slot indicated by the UL grant.

For CG2, the same mechanism as described above is also used for the cumulative count of counter DAI.

In the 5 CCs, only CC #4 includes an uplink slot, wherein the uplink slot refers to a slot including at least one of a physical uplink control channel PUCCH and a physical uplink shared channel PUSCH; therefore, the uplink feedback for 5 CCs is transmitted on CC #4, correspondingly the UL grant is also transmitted on CC #4, and DCI including the UL grant includes not only scheduling information of uplink data, but also Total DAI, for indicating the number of slots including DL assignment in the plurality of CGs, and in this embodiment, two CCs are included, so that DCI including UL grant includes two Total DAI fields for indicating the number of slots including DL assignment in CG1 and CG2, and the values thereof are 2 and 3, respectively.

The terminal can determine the size of the feedback codebook according to the reception of the Total DAI in combination with the reception of a plurality of DL assignments. Namely, there are 7 slots including the DL assignments in CG 1; and there are 4 slots including the DL assignments in CG 2. The codebook size is also related to the CBG configuration and the codeword configuration (assuming codeword configuration is 2, i.e. only two codewords are transmitted by each slot), CBG configuration is 4 in CG1, i.e. the feedback bits not required by each slot including DL assignments in CG1 are $N_{CBG}*N_{codeword}=4*2=8$, and then the total bits that CG1 needs to feed back are $N_{CBG}*N_{codeword}*N_{slot}=8*7=56$ bits. Similarly, the total bits that CG2 needs to feed back are $N_{CBG}*N_{codeword}*N_{slot}=8*2*4=64$ bits. The two parts of feedback bits are cascaded together, and the total bit number required by the terminal to be fed back in the uplink feedback resource is 120 bits.

In addition, when there is a UL grant (i.e., the terminal schedules uplink data and assigns PUSCH resources), the uplink feedback of the terminal is multiplexed with the uplink data in the PUSCH and transmitted, where the multiplexing mode may be that the feedback information performs puncturing transmission on the uplink data, or the uplink data performs rate matching transmission around the feedback information.

It should be appreciated that, the Total DAI and the UL grant are transmitted in the same DCI, the Total DAI indicates the number of all slots including DL assignments before the UL grant. If there are further DL assignments of the terminal after the UL grant and feedback is needed in the same feedback slot, Total DAI cannot predict the number indicating this part of DL assignments, a new mechanism will be needed to indicate this part of DL assignments to, and the feedback bit number will be accumulatively counted to the above total bit number for feedback together; or, the terminal will not be allowed to be further scheduled after the UL grant. As shown in the figure, the subcarrier spacing of the CC in which the UL grant is located is 30 kHz, and the UL grant is transmitted in the DCI of the last slot of 30 kHz, where the last slot of CC #1 (subcarrier spacing 60 kHz) is not allowed to schedule the terminal.

Applicable Embodiment 2

This applicable embodiment describes how to transmit a plurality of Total DAI information fields in one DCI.

This applicable embodiment includes the following several sub-embodiments:

Sub-embodiment 2.1: an information field is defined according to a maximum value of the bits required by a plurality of Total DAIs;

The plurality of component carriers are divided into the plurality of component carrier groups according to at least one of: code block group configuration information of component carriers; a slot length or a subcarrier spacing of the component carriers; and codeword configuration information of component carriers.

It can be seen that the maximum number of component carrier groups is fixed on the any one grouping basis. For example, when grouping according to CBG configuration, the protocol specifies that the CBG configuration includes 4 values: 2, 4, 6, and 8. The maximum number of component carrier groups is 4. Accordingly, when each CG corresponds to a Total DAI, 4 Total DAI fields are required at the maximum. In the DCI, according to the maximum value of the number of the total downlink assignment indexes, a first information field is defined to carry the plurality of total downlink assignment indexes; at this time, 4 Total DAI fields are fixedly configured in DCI no matter how many CGs are actually presented at current. The bit number of the first information field is equal to the bit number required when the total downlink assignment indexes having the maximum number are transmitted.

Each Total DAI field requires 2 bits, then 4 Total DAI fields are fixedly defined, and Total DAI information fields (the first information field) are 8 bits. When the actual CG number is less than 4, only the Total DAI corresponding to the CG is indicated by using the part of Total DAI fields. Unused Total DAI fields are invalid. Since there is consistent knowledge on how the CCs are grouped and how many groups are formed between the terminal and the base station, and further since which Total DAI field corresponds to which CG is determined according to predefined rules (e.g., the Total DAI field including the 2nd bit corresponds to the minimum CBG configuration, the Total DAI fields including the 3rd and 4th bits from the bottom correspond to the CG where CBG configuration is 4, and so on), the terminal can determine which Total DAI fields are valid and which Total DAI fields are invalid. No ambiguity arises.

For another example, when CC grouping is performed according to the slot length of the component carrier, the types of the slot lengths supported by the specific frequency band range are fixed. For example, the frequency bands below 6 GHz include 3 slot lengths: 0.25 ms, 0.5 ms, 1 ms. Thus, the number of CGs is at most 3, the first information field is defined as 6 bits, corresponding to three Total DAI fields.

For another example, when the CC grouping is performed based on the Code Block Group (CBG) configuration and the subcarrier spacing of the component carriers, the CBG configuration has 4 values, and the subcarrier spacing has 2 values in a specific frequency band (e.g., a frequency band above 6 GHz), the number of CGs is at most 8, and the first information field is defined as 16 bits, corresponding to 8 Total DAI fields.

Sub-embodiment 2.2: an information field is defined according to the bit number required by the Total DAI having the current number;

In the aggregated CCs, the CBG configuration of the plurality of CCs and the subcarrier spacing or the slot length of the plurality of CCs are all determined semi-statically, for example, configured to the terminal through RRC signaling; therefore, the CBG configuration, the subcarrier spacing or the slot length configuration of the plurality of CCs within a specified feedback window is determined. The actual CG number is also determined. Further, the number of the Total DAI fields is determined, and the number of bits required is also determined.

For example, only two CBG configurations, 4 and 8, are included in the currently aggregated CCs. That is, when the CCs are grouped according to the CBG configuration, there are two CGs. Therefore, in the DCI, according to the number of the current total downlink assignment indexes, a second information field is defined to carry the plurality of total downlink assignment indexes; the second information field corresponds to the number of bits required when the total downlink assignment indexes having the current number are transmitted. The second information field includes two Total DAI fields. If each Total DAI field requires 2 bits, the second information field occupies a Total of 4 bits.

Sub-embodiment 2.3: a part of the Total DAI fields are transmitted on the newly defined information fields, and a part of the Total DAI fields multiplex other information fields in the DCI;

In an embodiment, other information fields within the DCI include at least one of:

an uplink grant timing indication information field (configured to indicate the time domain position of the scheduled uplink data, i.e., the time interval between the uplink grant UL grant and the corresponding PUSCH, and when the timing information is a default value, the indication field is invalid and may be configured to indicate other information);

A Code Block Group Transmission Indication (CBGTI) information field (configured to indicate which code block groups are retransmitted currently, and when the transmission data is new transmission data, the indication field is invalid and can be configured to indicate other information).

FIG. 4 is a schematic diagram according to Sub-embodiment 2.3 of Applicable embodiment 2. As shown in FIG. 4, a DCI format including a UL grant is illustrated, wherein the DCI format includes, but is not limited to, the following information fields: an uplink grant information field, a CBG TI information field, an uplink scheduling timing information field K2, and a Total DAI field (or total DAI field).

In some cases, the CBG TI information field, and the uplink scheduling timing information field are not used. For example, when the uplink grant is a new transmission data for scheduling the terminal, the base station does not need to indicate the CBG TI information field to the terminal, and at this time, the CBG TI information field may be redefined, i.e., used to transmit part of Total DAI fields. Similarly, when the uplink grant uses a fixedly or implicitly indicated timing relationship, the base station does not need to indicate the uplink grant timing indication information K2 to the terminal by using the uplink scheduling timing information field, and at this time, the uplink grant timing indication information field may also be redefined, that is, used to transmit part of Total DAI fields.

In this embodiment, in the DCI, a third information field is defined to carry the one total downlink assignment index, and when the number of the total downlink assignment indexes is greater than one, other information fields in the multiplexing downlink control information carry other total downlink assignment indexes; wherein the third information field corresponds to the number of bits required when the one total downlink assignment index is transmitted.

In an embodiment, the third information field transmits the Total DAI of the CG where the third information field is located. When the CBG TI information field and the uplink grant timing indication information field can be used, they may be used to transmit the Total DAI of other CGs. If the current uplink grant timing indication information field and the CBG TI field are both valid, the DCI will not include the Total DAI information of other CGs.

Sub-embodiment 2.4: other information fields in the DCI are multiplexed to transmit the plurality of Total DAI fields.

In an embodiment, other information fields in the DCI include at least one of: an uplink grant timing indication information field (configured to indicate the time domain position of the scheduled uplink data, i.e., the time interval between the uplink grant UL grant and the corresponding PUSCH, and when the timing information is a default value, the indication field is invalid and may be configured to indicate other information);

A Code Block Group Transmission Indication (CBGTI) information field (configured to indicate which code block groups are retransmitted currently, and when the transmission data is new transmission data, the indication field is invalid and may be configured to indicate other information). FIG. 5 is a schematic diagram according to Sub-embodiment 2.4 of Applicable embodiment 2. As shown in FIG. 5, a DCI format including a UL grant is illustrated, wherein the DCI format includes, but is not limited to, the following information fields: an uplink grant information field, a CBG TI information field, and an uplink grant timing indication information field.

As in the foregoing description, in some cases, the CBG TI information field and the uplink grant timing indication information field are not used. At this time, these information fields may be redefined, i.e., used to transmit part of the Total DAI field.

Sub-embodiment 2.5: a designated information field is multiplexed in the DCI to transmit the plurality of Total DAI fields, and a fourth information field is defined for carrying the residual total downlink assignment indexes when the bit number which the designated information field is able to carry is less than the bit number required by the plurality of total downlink assignment indexes.

As described in sub embodiment 2.4, when the CBG TI information field and the uplink scheduling timing information field are not used, they may be redefined and used to transmit the Total DAI field. When the bit number which other information fields are able to carry is smaller than the bit number required by the plurality of total downlink assignment indexes, a fourth information field is defined to carry the residual total downlink assignment indexes, wherein the fourth information field corresponds to the bit number required when the residual total downlink assignment indexes are transmitted.

For example, 4 bits of other information fields may be used for Total DAI, i.e., 2 Total DAI fields may be transmitted. 4 Total DAI fields are currently required to be transmitted, and thus additional fields may be defined for two more Total DAI fields, and the fourth information field may be 4 bits.

Figure 6:
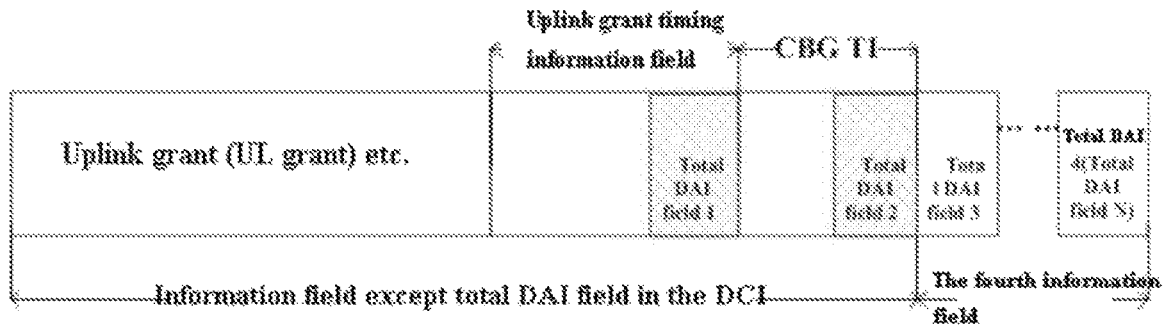
FIG. 6 is a schematic diagram according to a Sub-embodiment 2.5 of the Applicable embodiment 2.

In an embodiment, FIG. 6 is a schematic diagram according to Sub-embodiment 2.5 of Applicable embodiment 2, and as shown in FIG. 6, one Total DAI field is included in the uplink grant timing indication information field and the CBG TI field, respectively. Currently, a Total of N Total DAI fields need to be transmitted, with Total DAI fields 3 through N defined as the fourth information field.

Applicable Embodiment 3

This applicable embodiment describes a situation where a fixed codebook is used for a part of CG and a dynamic codebook is used for another part of CG.

Figure 7:
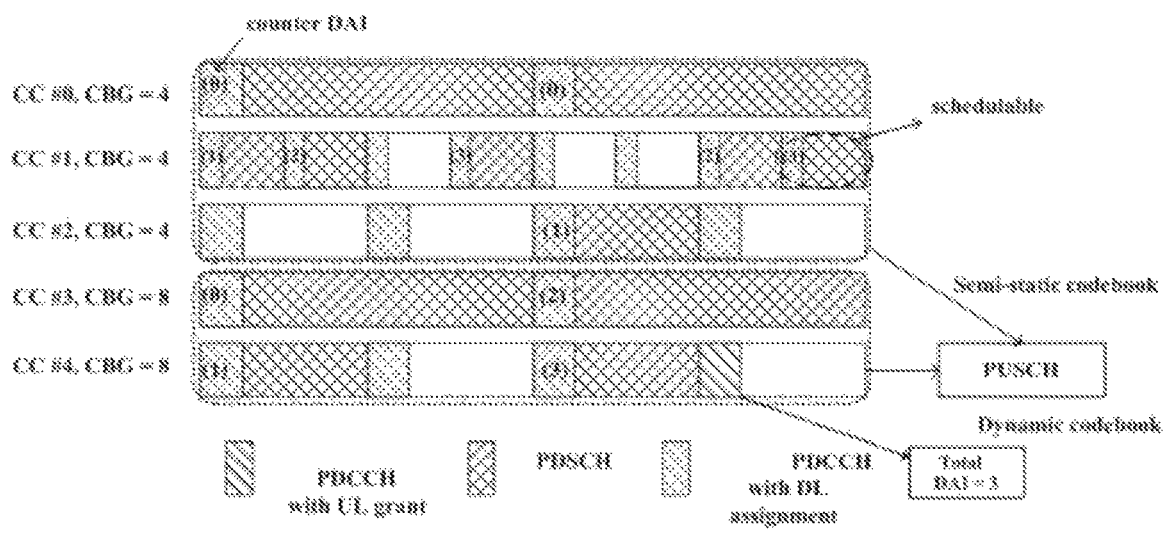
FIG. 7 is a schematic diagram according to an Applicable embodiment 3.

FIG. 7 is a schematic diagram according to Applicable embodiment 3. As shown in FIG. 7, there are 5 aggregated CCs, and the configuration thereof is the same as Applicable embodiment 1.

At this time, the plurality of CGs still use the counter DAI to count the DL assignment that required to be fed back in the same slot before the UL grant in the mode described in Embodiment 1.

CC #4 transmits DCI including the UL grant in the last slot, which includes the Total DAI field at the same time. But only one Total DAI field can be allowed to be transmitted in the current DCI. Namely, Total DAI=3 of CG where the current UL grant will be transmitted by default. Whereas the Total DAI of CG1 cannot be transmitted, therefore, CG1 cannot use a dynamic codebook but a semi-static codebook, i.e., feedback is required for each slot of each CC in CG 1, and the CG2 may use a dynamic codebook.

Determination of Codebook Size:

For CG1, the sum of the number of slots of every CC within the feedback window is 2+8+4=14, the CBG configuration is 4, and the codeword configuration is 1, then the size of the semi-static codebook is 14*4*1=56 bits.

For CG2, the size of the dynamic codebook is $N_{slot}*N_{CBG}*N_{codeword}=4*8*1=32$ bits;

The total number of bits is 88 bits.

It should be appreciated that, there is no CG indicated with Total DAI, since a semi-static codebook would be employed, the codebook size would be related to the total number of slots, rather than the number of slots including DL assignments. For this reason, the terminal can still be scheduled by the slots after the UL grant as long as within the feedback window.

Applicable Embodiment 4

This applicable embodiment describes a situation where a fixed codebook is used for another part of CG and a dynamic codebook is used for another part of CG.

Figure 8:
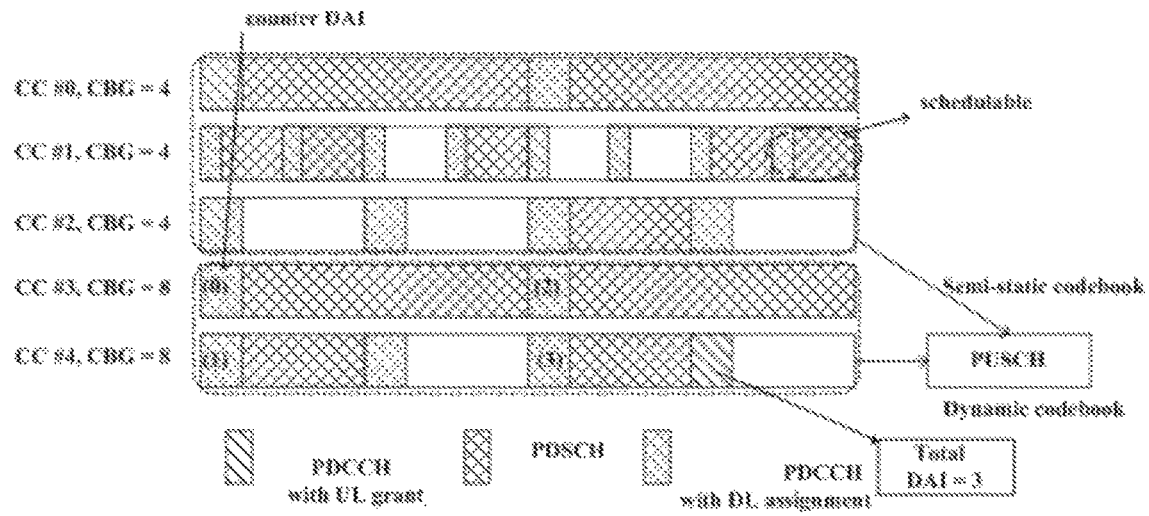
FIG. 8 is a schematic diagram according to an Applicable embodiment 4.

FIG. 8 is a schematic diagram according to Applicable embodiment 4. As shown in FIG. 8, there are 5 aggregated CCs, and the configuration thereof is the same as Applicable embodiment 1.

The difference between this applicable embodiment and Applicable embodiment 3 is that the base station configuration or protocol specifies: for CGs that do not include a UL grant, a semi-static codebook is fixedly used. Therefore, the CG1 determines that the dynamic codebook will not be used from the beginning of the feedback window, and will not include the counter DAI in the DCI including the DL assignments. This is because the function of the counter DAI is to indicate to the terminal which slots the terminal is scheduled in which if some slots are lost therein (i.e. the terminal does not successfully decode the PDCCH), the terminal will recognize that the counter DAI is not continuous in the DCI that is successfully received, determine the number of lost slots according to the interval between the counter DAIs, and reserve the corresponding number of bits in the feedback codebook. For the semi-static codebook, no matter whether a certain slot is successfully received or not, and no matter whether the slot is actually transmitted or not, the corresponding bit number will be reserved, and such indication is meaningless for determining the size of the semi-static codebook. Therefore, the DCI in which the DL assignment is located in CG1 does not include the counter DAI.

At this time, inside the plurality of CG, the counter DAI is still used to count the DL assignments required to be fed back in the same slot before the UL grant in the mode described in Applicable embodiment 1.

The CG2 may use a dynamic codebook.

Determination of Codebook Size:

For CG1, the sum of the number of slots per CC within the feedback window is 2+8+4=14, CBG configuration is 4, and codeword configuration is 1, then the size of the semi-static codebook is 14*4*1=56 bits.

For CG2, the size of the dynamic codebook is $N_{slot}*N_{CBG}*N_{codeword}=4*8*1=32$ bits.

The total number of bits is 88 bits.

It should be appreciated that, for the CG of the semi-static codebook, the codebook size is related to the total number of slots, rather than the number of slots including the DL assignments, so that a terminal can still be scheduled by the slots after the UL grant as long as within the feedback window.

Applicable Embodiment 5

This applicable embodiment describes another situation where the aggregated CCs are grouped according to CBG configuration, a plurality of component carrier groups (CGs) all use a dynamic codebook, and a total downlink assignment index (Total DAI) corresponding to all CGs is transmitted in DCI of the same CC.

As mentioned in Applicable embodiment 1, if the UL grant is not transmitted on a CC (e.g., CC #4, 30 kHz) with the largest subcarrier spacing, even if the UL grant is transmitted in the last slot of the CC within the feedback window, for CCs larger than 30 kHz (e.g., CC #1, 60 kHz), there will be a part of the slots (last slot) that are restricted from being scheduled.

Figure 9:
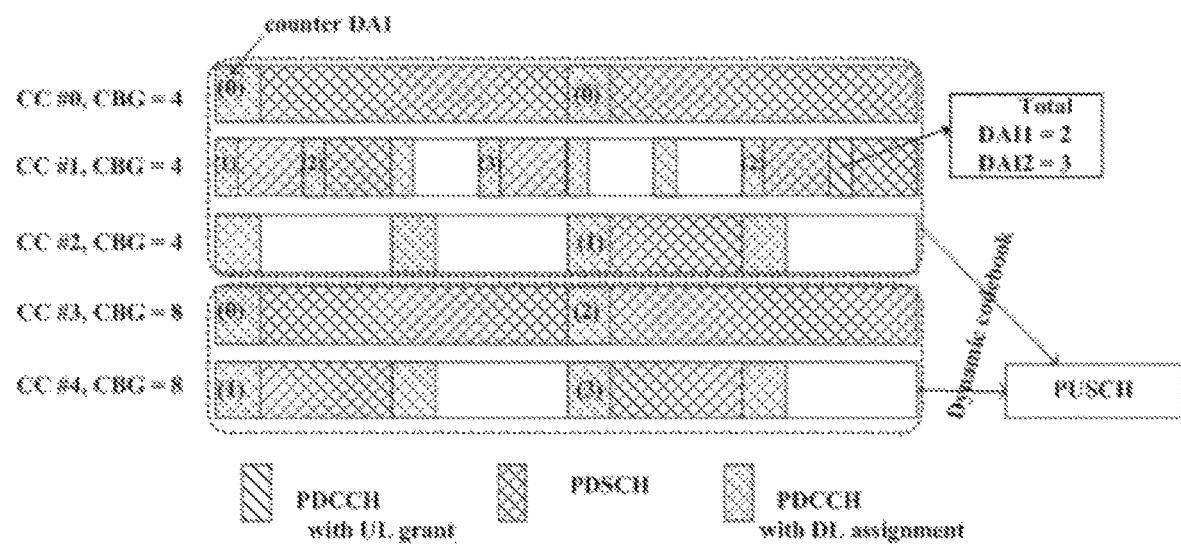
FIG. 9 is a schematic diagram according to an Applicable embodiment 5.

To avoid this problem, as shown in FIG. 9, it is a schematic diagram according to Applicable embodiment 5, the UL grant can be transmitted in the last slot of a CC (e.g. CC #1, 60 kHz) with the largest subcarrier spacing, and at this time, all slots including the DL assignments of the plurality of CCs within a feedback window can indicate the Total DAI within the DCI where the UL grant is located, and there is no scheduling restriction problem.

At this time, the system needs to support uplink scheduling between CCs spanning different TTI lengths. That is, the uplink transmission of the terminal on the second CC is scheduled on the first CC, and the first CC and the second CC have different subcarrier spacings.

Applicable Embodiment 6

This applicable embodiment describes another situation where the aggregated CCs are grouped according to subcarrier spacings, a plurality of component carrier groups all use dynamic codebooks, and the total downlink assignment indexes (Total DAIs) corresponding to all CGs are transmitted in the DCI of the same CC.

As mentioned in Applicable embodiment 1, if the UL grant is not transmitted on a CC (e.g., CC #4, 30 kHz) with the largest subcarrier spacing, even if the UL grant is transmitted in the last slot of the CC within the feedback window, for CCs larger than 30 kHz (e.g., CC #1, 60 kHz), there will be a part of the slots (last slot) that are restricted from being scheduled.

As mentioned in Applicable embodiment 1, if a UL grant is not transmitted on a CC (e.g., CC #4, 30 kHz) with the largest subcarrier spacing, even if the UL grant is transmitted on the last slot of the CC within the feedback window, for CCs larger than 30 kHz (e.g., CC #1, 60 kHz), there will be a part of the slots (last slot) that are restricted from being scheduled.

Figure 10:
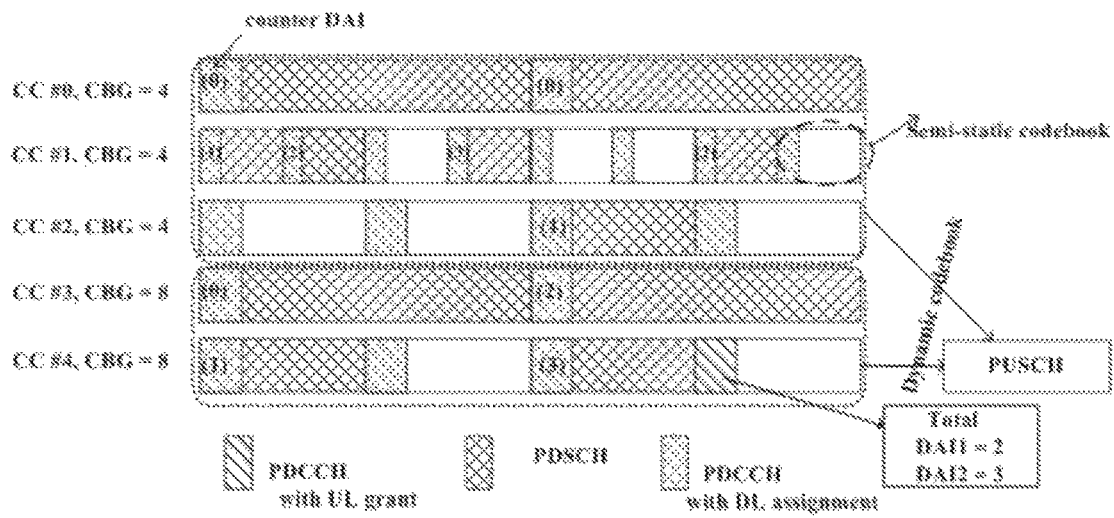
FIG. 10 is a schematic diagram according to an Applicable embodiment 6.

To avoid this problem, as shown in FIG. 10, it is a schematic diagram according to Applicable embodiment 6, and for CCs larger than 30 kHz, a semi-static codebook is used in a slot after the UL grant.

In an embodiment, since the UL grant transmission time cannot judge whether there are DL assignments in the slot in the virtual circle, when determining the codebook, the slots after the UL grant within the feedback window are defined to include the DL assignments. That is, corresponding bit numbers are reserved in the feedback codebook.

For CG1, there are total 8 slots, in addition to the 7 slots including the DL assignments indicated by Total DAI, plus the number of slots after the UL grant, codebook size=$8*N_{CBG}*N_{codeword}=8*4*1=32$. $N_{CBG}=4$, and $N_{codeword}=1$.

For CG2, there are no slots after the UL grant within the feedback window except for the 4 slots including the DL assignments indicated by the Total DAI, so the slot number is still 4, and codebook size=$4*N_{CBG}*N_{codeword}=4*8=32$, wherein $N_{CBG}=8$, and $N_{codeword}=1$.

The total feedback codebook size is 64 bits.

Applicable Embodiment 7

This applicable embodiment describes a situation where the aggregated CCs are grouped according to subcarrier spacings, a plurality of component carrier groups all use dynamic codebooks, and the total downlink assignment indexes (Total DAIs) corresponding to all CGs are transmitted in DCI of the same CC.

Figure 11:
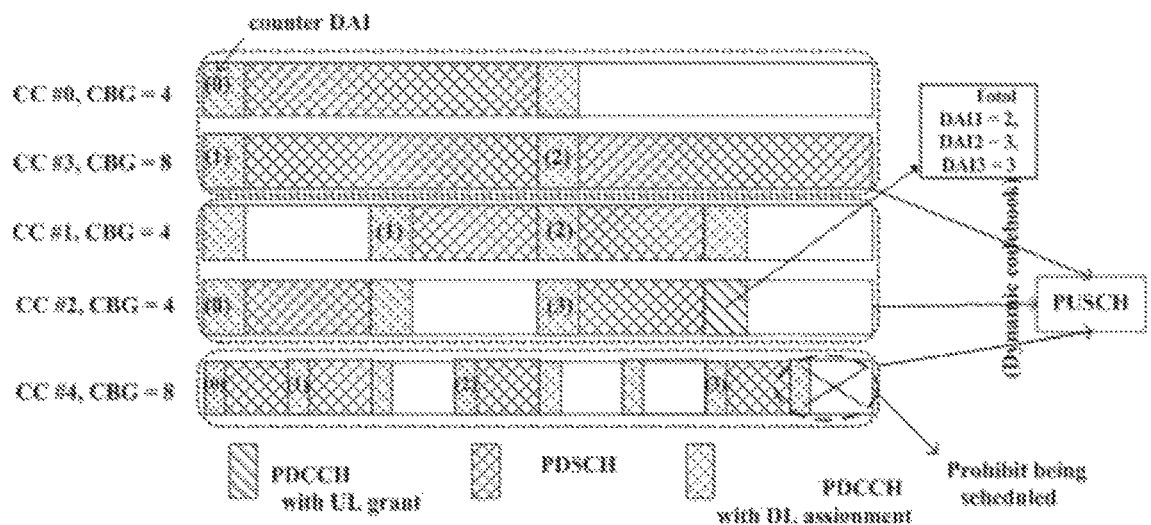
FIG. 11 is a schematic diagram according to an Applicable embodiment 7.

FIG. 11 is a diagram according to Applicable embodiment 7. As shown in FIG. 11, a total of 5 CCs are included to operate in a CA manner, i.e., CC #0 to CC #4. For example, configuration is shown in Table 2 which is a configuration table of CC #0 to CC #4 according to Applicable embodiment 7:

TABLE 2

| CC | CBG configuration | Subcarrier spacing (SCS) | CG |
|---|---|---|---|
| #0 | 4 | 15 kHz | CG1 |
| #1 | 4 | 30 kHz | CG2 |
| #2 | 4 | 30 kHz | CG2 |
| #3 | 8 | 15 kHz | CG1 |
| #4 | 8 | 60 kHz | CG3 |

The aggregated CCs are divided into three CGs according to CBG configuration, CG1 including CC #0 and CC #3; CG2 including CC #1, CC #2; and CG3 including CC #4.

The counter DAI is used to count in three CGs, respectively. In other words, a counter DAI field is included in each DCI including the DL assignments, for indicating which number of the scheduled slots in a CG is the current slot. The counting sequence adopts a principle of frequency domain priority. That is, slots including the DL assignments on all CCs are accumulated at the monitoring occasion of the previous PDCCH first. For example, for CG1, the terminal is scheduled by DCIs of CC #0 and CC #3 at the first PDCCH monitoring occasion. That is, the DCIs include DL the assignments, and counter DAI fields of each DCI are respectively indicated as 0 and 1, indicating that the current slot is the first and second scheduled slots in the CG, respectively (note: DAI is counted from '0' and is cyclically counted at a period of 4, i.e., 01230123 . . . ), such cycle count is to ensure that only 2 bits can be used to indicate any DAI value in the DCI). Next, the second PDCCH monitoring occasion is accumulatively counted, only the DCI of CC #3 schedules the terminal, and the counter DAI field of the DCI indicates 2. The count of the DL assignments of all the slots before the UL grant received within the feedback time window is completed.

Similarly, for CG2 and CG3, the same mechanism as described above is also used for the cumulative count of counter DAI. Similar to the Applicable embodiment 1, after the Total DAI, downlink data corresponding to the same feedback slot is not allowed any more, i.e. as shown in the figure, the subcarrier spacing of CC #2 where the UL grant is located is 30 kHz, the UL grant is transmitted in DCI of the last slot of 30 kHz, at this time, the last slot of CC #4 (subcarrier spacing of 60 kHz) is not allowed to schedule the terminal to feed back in the same slot.

The Total DAI values for the three CGs are: 2, 3, and 3.

It should be appreciated that there are some CGs with different CBG configurations, such as CG1, CC #0 with CBG configuration 4, and CC #3 with CBG configuration 8. At this time, each CC is configured according to the largest CBG in the CG, and feedback bits are reserved in the feedback codebook, so that a problem can be avoided. In other words, the number of reserved bits cannot be determined due to the fact that the terminal cannot determine which CC the lost downlink assignment belongs to after the downlink assignment of a certain CC is lost. At this time, as long as the terminal judges that any DL assignment is lost by receiving the counter DAI, the maximum CBG number in the reserved CG is fixed, and for CG1, and the maximum CBG number is 8. For some CCs with CBG configuration less than 8, residual bits in the feedback information are invalid, or when the CBG configuration of the CC is a submultiple of the maximum CBG number, the feedback information is processed repeatedly. For example, the number of feedback bits required for a certain slot of the CC is 4, and if feedback required be performed according to the maximum CBG configuration (i.e. 8) in the CG according to the above rule, the 4-bit feedback information is repeated twice to reach 8 bits.

For CG2, since CBG configuration of both CCs are 4, each slot including downlink assignment occupies 4 bits in the feedback codebook.

Figure 12:
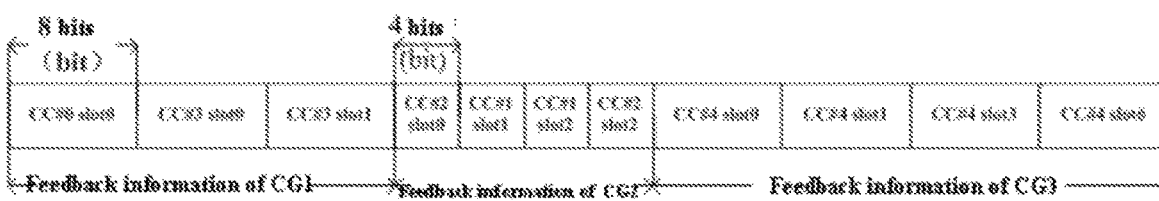
FIG. 12 is another schematic diagram according to the Applicable embodiment 7.

FIG. 12 is another schematic diagram according to Applicable embodiment 7. As shown in FIG. 12, a feedback codebook in a feedback slot for a terminal sequentially includes feedback information of the downlink assignments in the plurality of CCs (in this applicable embodiment, it is assumed that codeword configurations of a plurality of CCs are all 1), and in an embodiment, a codebook is formed in the sequence of CG1, CG2, and CG 3. Inside each CG, feedback is performed in sequence according to a 'frequency-first (frequency domain first and time domain later)' sequence. Taking CG1 as an example, 3 pieces of 8-bit feedback information are included, wherein the first piece of 8-bit feedback information corresponds to the downlink assignment in CC #0 slot 0; the second piece of 8-bit feedback information corresponds to the downlink assignment in CC #3 slot 0; and the third piece of 8-bit feedback information corresponds to the downlink assignment in CC #3 slot 1.

For other CG, a feedback codebook is formed by using the feedback information in a similar way, and the feedback codebook is transmitted to the base station in the uplink slot indicated by the uplink grant, wherein the uplink slot indicated by the uplink grant refers to the slot for transmitting uplink data indicated when the base station schedules the terminal to transmit the uplink data by using the uplink grant information. In an embodiment, the uplink grant may further indicate a specific resource in a physical uplink shared channel PUSCH occupied by the terminal for uplink data, and the feedback information is also carried on the PUSCH and performs puncturing transmission on the uplink data, or performs rate matching transmission on the uplink data according to the resource occupied by the feedback information.

The present disclosure describes the generation of feedback codebooks grouped by aggregated CCs according to subcarrier intervals and a feedback manner, because there is a direct conversion relationship between the subcarrier spacing and slot length (or Transmission Time Interval lengths, TTI lengths). That is, a subcarrier spacing of 15 kHz corresponds to a slot length of 1 ms, a subcarrier spacing of 30 kHz corresponds to a slot length of 0.5 ms, and a subcarrier spacing of 60 kHz corresponds to a slot length of 0.25 ms, etc. Thus, the method is also similar when the aggregated CCs are grouped according to slot lengths.

In the above embodiment, the counter DAI is used to count according to the number of slots including downlink assignments, and the counter DAI may also be used to count according to the number of code block groups (CBGs); in one embodiment, when the counter DAI is used to count in the CG by the number of CBGs, the value of the counter DAI in the DCI including the DL assignments represents: accumulating CBGs in a certain sequence (such as a frequency domain first and a time domain later), until the number of CBGs included in the current slot of the current CC is reached; correspondingly, the number of downlink assignments indicated by Total DAI field in DCI where the UL grant is located may be: the total number of CBGs in all slots carrying the downlink assignment.

Applicable Embodiment 8

This applicable embodiment describes a situation where the aggregated CCs are grouped according to codebook configuration information, the plurality of component carrier groups all use dynamic codebooks, and the total downlink assignment indexes (Total DAIs) corresponding to all CGs are transmitted in DCI of the same CC.

Figure 13:
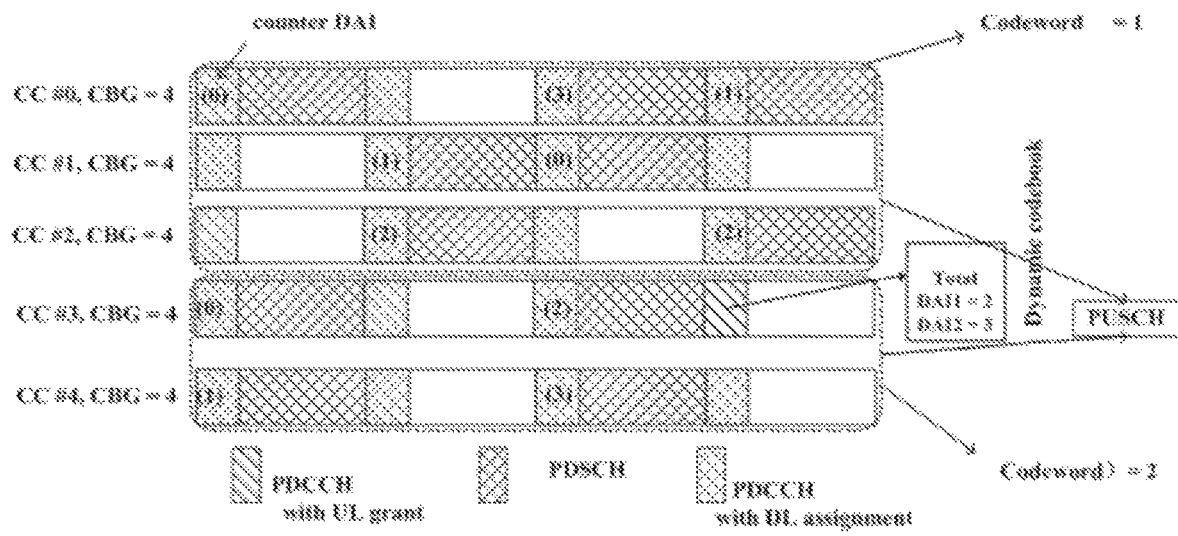
FIG. 13 is a schematic diagram according to an Applicable embodiment 8.

FIG. 13 is a schematic diagram according to Applicable embodiment 8. As shown in FIG. 13, a total of 5 CCs are included to operate in a CA manner, i.e., CC #0 to CC #4. For the sake of simplicity of description, it is assumed in this applicable embodiment that configurations (CBG configuration and subcarrier spacing) of the plurality of CCs are the same except for codewords. For example, configuration is shown in Table 3 which is a configuration table of CC #0 to CC #4 according to Applicable embodiment 8:

TABLE 3

| CC | CBG configuration | Subcarrier spacing (SCS) | Codeword configuration | CG |
|---|---|---|---|---|
| #0 | 4 | 30 kHz | 1 | CG1 |
| #1 | 4 | 30 kHz | 1 | CG1 |
| #2 | 4 | 30 kHz | 1 | CG1 |
| #3 | 4 | 30 kHz | 2 | CG2 |
| #4 | 4 | 30 kHz | 2 | CG2 |

The aggregated CCs are divided into two CGs according to codeword configuration, the codeword configuration of the CG1 is 1, namely, one code word is transmitted in one slot and comprises CC #0, CC #1 and CC #2; the codeword configuration of CG2 is 2, i.e. two codewords are transmits in one slot, including CC #3 and CC #4.

The counter DAI is used to count in two CGs, respectively, i.e., a counter DAI field is included in each DCI including DL assignments, for indicating which number of the scheduled slots in a CG is the current slot. The counting sequence adopts the principle of frequency domain priority. That is, slots including the DL assignments on all CCs are accumulated on the previous PDCCH monitoring occasion first. For example, for CG1, the DL assignments are counted in the following sequence: CC #0 slot0, CC #1 slot1, CC #2 slot1, CC #0 slot2, CC #1 slot2, CC #0 slot3, CC #2 slot 3; the counter DAI sequentially has the following DCI of the slot: 0, 1, 2, 3, 0, 1, 2.

Similarly, CG2 counts DL assignments in the following sequence: CC #3 slot0, CC #4 slot0, CC #3 slot2, CC #4 slot 2; the counter DAI sequentially has the following DCI of the slot: 0, 1, 2, 3.

Thus, the Total DAI for the two CGs are: 2 and 3. Since DAI uses cycle counting, at this time, for CG1, Total DAI=2 indicates that there are 7 slots including DL assignments.

Figure 14:
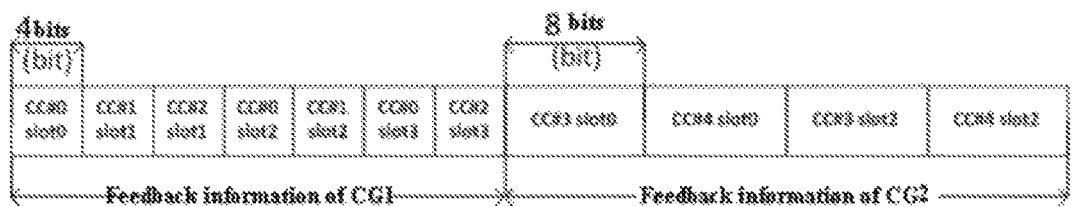
FIG. 14 is another schematic diagram according to the Applicable embodiment 8.

FIG. 14 is another schematic diagram according to Applicable embodiment 8. As shown in FIG. 14, a feedback codebook at a feedback slot of a terminal sequentially includes feedback information of downlink assignments in a plurality of CGs. Illustratively, the codebook is formed according to the sequence of CG1 and CG 2. Inside each CG, feedback is performed in sequence according to a 'frequency-first (frequency domain first and time domain later)' sequence. Taking CG1 as an example, since codeword configuration is 1, downlink data in one slot only needs 4 bits of feedback information for 4 CBG configurations. Therefore, feedback for CG1 includes 7 pieces of 4-bit feedback information in total, and a corresponding relationship between bits in a codebook and downlink assignment is shown in the figure.

For CG2, since codeword configuration is 2, for 4 CBG configurations, downlink data in one slot requires feedback information of 2*4=8 bits. Therefore, for CG1, the feedback includes 4 pieces of feedback information of 8 bits in total, the correspondence between bits in the codebook and downlink assignment is shown in the figure.

Note: in the above applicable embodiments, the component carriers are divided into N CGs according to a certain factor (CBG configuration, subcarrier spacing or slot length, codeword configuration), and the CCs may also be divided into a plurality of CGs according to a combination of any of the above factors. For different CGs, the counter DAI is used to count respective downlink assignment, a plurality of Total DAI fields are included in the DCI including the UL grant and are transmitted to the terminal, and the terminal determines the number of downlink assignments corresponding to the CGs by using the plurality of Total DAIs, so that the bit number of the feedback information can be determined. Herein some CGs may also use a semi-static codebook, so that the Total DAI of the CG is not required to be transmitted and the terminal feeds back each slot in this CG.

Through the description of the foregoing embodiments, it is clear to those skilled in the art that the method according to the foregoing embodiments may be implemented by software plus a necessary general hardware platform, and certainly may also be implemented by hardware, but the former is a better implementation mode in many situations. Based on such understanding, the technical solutions of the present disclosure or portions thereof that contribute to the related art may be embodied in the form of a software product, where the computer software product is stored in a storage medium (such as a ROM/RAM, a magnetic disk, and an optical disk), and includes several instructions for enabling a terminal device (which may be a mobile phone, a computer, a server, or a network device) to execute the method described in the embodiments of the present disclosure.

Embodiment 2

In this embodiment, there is further provided a data transmission apparatus, which is used to implement the foregoing embodiments and preferred embodiments, and details of which will be omitted. As used hereinafter, the term "module" may include a combination of at least one of software and hardware that implements a predetermined function. Although the apparatus described in the embodiments below are preferably implemented in software, an implementation in hardware or a combination of software and hardware is also possible and contemplated.

According to an embodiment of the present disclosure, there is further provided a data transmission apparatus, including: a generation module and a transmission module.

The generation module is configured to generate at least one total downlink assignment index for a plurality of component carrier groups.

The transmission module is configured to transmit at least one total downlink assignment index carried in downlink control information to transmit to a receiving end.

In an embodiment, the generation module is further configured to divide the plurality of component carriers into the plurality of component carrier groups according to at least one piece of: code block group configuration information of component carriers; a slot length or a subcarrier spacing of the component carriers; and codeword configuration information of component carriers.

In an embodiment, the code block group configuration information comprises at least one of: the number of code block groups included in a slot; and the number of code block groups included in a transmission block.

In an embodiment, the code block group configuration information includes at least one of: the number of codewords included in a slot; and the number of codewords included in a transmission block.

In an embodiment, generating the at least one total downlink assignment index for the plurality of component carrier groups comprises at least one of: each of the generated total downlink assignment indexes corresponding to a component carrier group; the number of the at least one of the generated total downlink assignment indexes being less than or equal to the number of the plurality of component carrier groups.

In an embodiment, the total downlink assignment index is used to indicate the number of downlink assignments required to be fed back in a specified uplink slot before an uplink grant in the component carrier group corresponding to the total downlink assignment index; wherein the number of the downlink assignments includes at least one of: the number of slots carrying the downlink assignments; and the total number of the code block groups in all the slots carrying the downlink assignments.

In an embodiment, the specified uplink slot comprises: an uplink slot indicated by the uplink grant.

In an embodiment, the uplink grant is transmitted in the same downlink control information with the total downlink assignment index.

In an embodiment, carrying the at least one total downlink assignment index in the downlink control information to transmit to the receiving end comprises at least one of: setting, in the downlink control information, a first information field for carrying the at least one total downlink assignment index, according to the maximum number of the total downlink assignment indexes, wherein the bit number occupied by the first information field is equal to the bit number required when the total downlink assignment indexes having the maximum number are transmitted; setting, in the downlink control information, a second information field for carrying the at least one total downlink assignment index, according to the current number of the total downlink assignment indexes, wherein the bit number occupied by the second information field is equal to the bit number required when the total downlink assignment indexes having the current number are transmitted; setting, in the downlink control information, a third information field for carrying one total downlink assignment index; wherein, when the number of the total downlink assignment indexes is more than one, information fields except the third information field in the downlink control information are multiplexed to carry residual total downlink assignment indexes, wherein the bit number occupied by the third information field is equal to the bit number required when the one total downlink assignment index is transmitted; multiplexing, in the downlink control information, a specified information field in the downlink control information to carry the at least one total downlink assignment index; and multiplexing, in the downlink control information, the specified information field in the downlink control information to carry the total downlink assignment index, wherein, under the condition that the bit number which the specified information field is able to carry is smaller than the bit number required when a plurality of total downlink assignment indexes are transmitted, a fourth information field to carry the residual total downlink assignment indexes is set, wherein the bit number occupied by the fourth information field is equal to the bit number required when the residual total downlink assignment indexes are transmitted.

In an embodiment, the specified information field in the downlink control information comprises at least one of: an indication information field of uplink grant timing; and an indication information field of code block group transmission.

In an embodiment, the third information field is used to carry a total downlink assignment index corresponding to a component carrier group where the third information field is located.

According to another embodiment of the disclosure, there is further provided a data reception apparatus, including: a reception module and a determination module.

The reception module is configured to receive at least one total downlink assignment index in a downlink control information, wherein the at least one total downlink assignment index corresponds to a plurality of component carrier groups.

The determination module is configured to determine the size of the feedback codebook of the corresponding component carrier group according to the plurality of total downlink assignment indexes.

In an embodiment, the determination module is further configured to, after receiving at least one total downlink assignment index in the downlink control information, according to the total downlink assignment index, the following information is determined: the number of downlink assignments required to be fed back in a specified uplink slot before an uplink grant in the component carrier group corresponding to the total downlink assignment index; wherein the number of the downlink assignments includes at least one of: the number of slots carrying the downlink assignments; and the total number of the code block groups carrying all the slots of the downlink assignments.

In an embodiment, the specified uplink slot comprises: an uplink slot indicated by the uplink grant.

In an embodiment, the uplink grant information and the total downlink assignment index are received in the same downlink control information.

It should be noted that the above modules may be implemented by software or hardware, and for the latter, the following may be implemented, but not limited to: the modules all located in the same processor; or, the modules located in different processors in any combination thereof.

Embodiment 3

According to another embodiment, there is further provided a processor configured to execute a program, wherein the program, when executed on the processor, performs the method according to any one of the above optional embodiments.

Embodiment 4

According to an embodiment of the present disclosure, there is further provided a storage medium, comprising a stored program, wherein the program, when executed, performs the method according to any one of the above optional embodiments.

Obviously, those skilled in the art should appreciate that the above-mentioned modules or steps of the present disclosure may be implemented by a general-purpose computing device, and they may be concentrated on a single computing device or distributed in a network composed of multiple computing devices, in an embodiment, they may be implemented with program code executable by a computing device, so that they may be stored in a storage device and executed by the computing device, and in some cases, the steps shown or described may be performed in a different order than here, or they may be made separately into individual integrated circuit modules, or multiple modules or steps among them may be made into a single integrated circuit module for implementation. In this way, the present disclosure is not limited to any specific combination of hardware and software.

The invention claimed is:

1. A data transmission method, comprising:
generating at least one total downlink assignment index for a plurality of component carrier groups; and
carrying the at least one total downlink assignment index in a piece of downlink control information to transmit to a receiving end;
wherein an uplink grant is transmitted in the same downlink control information with the at least one total downlink assignment index, and the downlink control information includes at least two Total DAI fields.

2. The method according to claim 1, wherein a plurality of component carriers are divided into the plurality of component carrier groups according to at least one of:
code block group configuration information of the component carriers;
a slot length or a subcarrier spacing of the component carriers; and codeword configuration information of the component carriers.

3. The method according to claim 2, wherein the code block group configuration information comprises at least one of:
a number of code block groups included in a slot; and
a number of code block groups included in a transmission block.

4. The method according to claim 2, wherein the codeword configuration information comprises at least one of:
a number of codewords included in a slot; and
a number of codewords included in a transmission block.

5. The method according to claim 1, wherein the step of generating the at least one total downlink assignment index for the plurality of component carrier groups comprises at least one of:
each of the generated total downlink assignment indexes corresponding to a component carrier group;
the number of the at least one of the generated total downlink assignment indexes being less than or equal to the number of the plurality of component carrier groups.

6. The method according to claim 1, wherein the total downlink assignment index is configured to indicate a number of downlink assignments required to be fed back in a specified uplink slot before the uplink grant, in the component carrier group corresponding to the total downlink assignment index; wherein
the number of the downlink assignments includes at least one of:
a number of slots carrying the downlink assignments; and
a total number of the code block groups in all the slots carrying the downlink assignments.

7. The method according to claim 6, wherein the specified uplink slot comprises: an uplink slot indicated by the uplink grant.

8. The method according to claim 1, wherein the step of carrying the at least one total downlink assignment index in the downlink control information to transmit to the receiving end comprises at least one of:
setting, in the downlink control information, a first information field for carrying the at least one total downlink assignment index, according to a maximum number of the total downlink assignment indexes, wherein a bit number occupied by the first information field is equal to a bit number required when the maximum number of the total downlink assignment indexes are transmitted;
setting, in the downlink control information, a second information field for carrying the at least one total downlink assignment index, according to a current number of the total downlink assignment indexes, wherein a bit number occupied by the second information field is equal to a bit number required when the current number of the total downlink assignment indexes are transmitted;
setting, in the downlink control information, a third information field for carrying one total downlink assignment index, wherein, when the number of the total downlink assignment indexes is more than one, information fields in the downlink control information except the third information field are multiplexed to carry residual total downlink assignment indexes, wherein a bit number occupied by the third information field is equal to a bit number required when the one total downlink assignment index is transmitted;
multiplexing, in the downlink control information, a specified information field in the downlink control information to carry the at least one total downlink assignment index; and
multiplexing, in the downlink control information, the specified information field in the downlink control information to carry the total downlink assignment index, wherein, under the condition that the bit number the specified information field is able to carry is smaller than the bit number required when a plurality of total downlink assignment indexes are transmitted, a fourth information field to carry the residual total downlink assignment indexes is set, wherein a bit number occupied by the fourth information field is equal to a bit number required when the residual total downlink assignment indexes are transmitted.

9. The method according to claim 8, wherein the specified information field in the downlink control information comprises at least one of:
an indication information field of uplink grant timing; and
an indication information field of code block group transmission.

10. The method according to claim 8, wherein the third information field is configured to carry a total downlink assignment index corresponding to a component carrier group where the third information field is located.

11. A data transmission apparatus, configured to perform the method according to claim 1.

12. A storage medium, comprising a stored program, wherein the program, when executed, performs the method according to claim 1.

13. A processor, configured to execute a program, wherein the program, when executed by the processor, performs the method according to claim 1.

14. A data reception method, comprising:
receiving, in downlink control information, at least one total downlink assignment index, wherein the at least one total downlink assignment index corresponds to a plurality of component carrier groups; and
determining a size of a feedback codebook of the corresponding component carrier group, according to the at least one total downlink assignment index;
wherein an uplink grant information and the at least one total downlink assignment index are received in the same downlink control information, and the downlink control information includes at least two Total DAI fields.

15. The method according to claim 14, wherein, after at least one total downlink assignment index in the downlink control information is received, the total downlink assignment index is configured to determine information of:
a number of downlink assignments required to be fed back in a specified uplink slot before the uplink grant, in the component carrier group corresponding to the total downlink assignment index,
wherein the number of the downlink assignments comprises at least one of:
a number of slots carrying the downlink assignments; and
a total number of the code block groups carrying all the slots of the downlink assignments.

16. The method according to claim 15, wherein the specified uplink slot comprises: the uplink slot indicated by the uplink grant.

17. A data reception apparatus, configured to perform the method according to claim 14.

* * * * *